United States Patent
Tanimoto

(10) Patent No.: US 10,114,311 B2
(45) Date of Patent: Oct. 30, 2018

(54) LIGHT EMITTING SUBSTRATE, PRINT HEAD, AND IMAGE FORMING APPARATUS

(71) Applicants: KABUSHIKI KAISHA TOSHIBA, Minato-ku, Tokyo (JP); TOSHIBA TEC KABUSHIKI KAISHA, Shinagawa-ku, Tokyo (JP)

(72) Inventor: Koji Tanimoto, Kannami Tagata Shizuoka (JP)

(73) Assignees: KABUSHIKI KAISHA TOSHIBA, Tokyo (JP); TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/467,074

(22) Filed: Mar. 23, 2017

(65) Prior Publication Data

US 2018/0259871 A1    Sep. 13, 2018

(30) Foreign Application Priority Data

Mar. 8, 2017   (JP) .................................. 2017-044106

(51) Int. Cl.
G03G 15/00     (2006.01)
G03G 15/043    (2006.01)
H04N 1/29      (2006.01)

(52) U.S. Cl.
CPC ............. *G03G 15/043* (2013.01); *H04N 1/29* (2013.01); *H04N 2201/0094* (2013.01)

(58) Field of Classification Search
CPC . G03G 15/043; H04N 1/29; H04N 2201/0094
See application file for complete search history.

(56) References Cited

U.S. PATENT DOCUMENTS

| | | | |
|---|---|---|---|
| 2006/0274333 A1* | 12/2006 | Jeon | G02B 26/127 358/1.7 |
| 2010/0080594 A1* | 4/2010 | Sowa | G03G 15/043 399/51 |
| 2017/0351193 A1 | 12/2017 | Ishikawa et al. | |
| 2017/0353622 A1 | 12/2017 | Ishikawa et al. | |
| 2018/0074429 A1 | 3/2018 | Tanimoto | |

FOREIGN PATENT DOCUMENTS

JP    2011-183802    9/2011

* cited by examiner

*Primary Examiner* — Hoang Ngo
(74) *Attorney, Agent, or Firm* — Amin, Turocy & Watson LLP

(57) ABSTRACT

According to one embodiment, there is provided a light emitting substrate which includes a transparent substrate, a plurality of light emitting element groups, and a control unit. The plurality of light emitting element groups are formed by overlapping a first light emitting element and a second light emitting element on the transparent substrate. The control unit controls light emitting of the first light emitting element and the second light emitting element of the plurality of light emitting element groups. Amounts of light emitted from the plurality of light emitting element groups are uniform.

8 Claims, 12 Drawing Sheets

| LIGHT EMITTING ELEMENT GROUP No. (ADDRESS) | 1 | 2 | 3 | 4 | 5 | 6 | 7 | 8 | 9 | ... | 19 | 20 |
|---|---|---|---|---|---|---|---|---|---|---|---|---|
| FIRST CORRECTION MEMORY H55 | FF | FF | FF | FF | FF | FF | FF | FF | FF | ... | FF | FF |
| SECOND CORRECTION MEMORY H56 | 00 | 00 | 00 | 00 | 00 | 00 | 00 | 00 | 00 | ... | 00 | 00 |

| LIGHT EMITTING ELEMENT GROUP No. (ADDRESS) | 1 | 2 | 3 | 4 | 5 | 6 | 7 | 8 | 9 | ... | 19 | 20 |
|---|---|---|---|---|---|---|---|---|---|---|---|---|
| FIRST CORRECTION MEMORY H55 | FF | FF | FF | FF | FF | FF | FF | FF | FF | ... | FF | FF |
| SECOND CORRECTION MEMORY H56 | 6D | 3F | 1C | 08 | 00 | 0D | 1C | 3F | 5E | ... | 55 | 6D |

LIGHT EMITTING SUBSTRATE, PRINT HEAD, AND IMAGE FORMING APPARATUS

CROSS-REFERENCE TO RELATED APPLICATIONS

This application is based upon and claims the benefit of priority from Japanese Patent Application No. 2017-044106, filed Mar. 8, 2017, the entire contents of which are incorporated herein by reference.

FIELD

Embodiments described herein relate generally to a print head and an image forming apparatus.

BACKGROUND

In the related art, a printer, a copy machine, and a complex machine (multi-functional peripheral (MFP)) which use an electrophotographic process are known. As exposing means (exposing unit) of these equipments, there are two types called a laser optical system (laser scan unit (LSU)) and a print head (solid head). In the laser optical system, a photoconductive drum is exposed by being scanned with a laser light beam using a polygon mirror. In the print head, the photoconductive drum is exposed by light beams output from a plurality of light emitting elements such as a light emitting diode (LED).

In the laser optical system, the polygon mirror is required to be rotated at high speed, and thus much energy is consumed and operation sound is generated when an image is formed. Also, since a mechanism for scanning with laser light is required, a unit tends to be large.

Meanwhile, the print head has a structure in which light beams emitted from the plurality of light emitting elements form an image on the photoconductive drum using a small size lens forming an erected image, which is called a rod lens array. Because of this structure, the print head can be miniaturized. In addition, there is no operating unit, and thus the exposing unit makes less noise.

As the print head, a print head using an organic EL (organic light emitting diode (OLED)) is also developed in addition to a print head using an LED (LED chips are arranged). As the print head using the LED, a print head in which LED chips are arranged on a print substrate is generally used. In the organic EL (OLED), the organic ELs are collectively formed on the substrate using a mask, and the light emitting elements can be accurately arranged therein. When the organic EL is used as the light emitting element, there is merit in that an image is formed with high accuracy. For example, an example is known in which the plurality of light emitting elements constituted by the organic EL are formed on a glass substrate.

In order to form a good image by the print head using the LED or the organic EL (OLED), after light beams output from the plurality of light emitting elements pass through the rod lens array, light intensity (amount of light) or a diameter of the light beam is required to be uniform on the photoconductive drum.

In order to uniform the light intensity (amount of light) or the diameter of the light beam on the photoconductive drum, light intensity (amount of light) of each light emitting element is generally controlled.

In order to control the light intensity (amount of light) of each light emitting element, a method such as a control of an amount of the current flowing in each light emitting element or a control of light emitting time per unit time is adopted.

For example, the light intensity (amount of light) or the diameter of the light beam on the photoconductive drum is uniformed by individually setting the amount of the current flowing in each light emitting element or light emitting time per unit time in every light emitting element.

For example, an example is known in which the amount of light (light intensity) or a diameter of a dot (diameter of light beam) is controlled by controlling the amount of the current flowing in the light emitting element.

In addition, for example, it is known that, the greater the current flowing in the light emitting element, the faster degradation of the amount of light of the light emitting element (organic EL element).

DETAILED DESCRIPTION

It is known that a light emitting element is quickly deteriorated as much as the light intensity (amount of light) is increased by increasing current flowing in a light emitting element (organic EL element). From such a background, a technique of controlling deterioration of the light emitting element is demanded.

An object of an exemplary embodiment is to provide a light emitting substrate, a print head, and an image forming apparatus excellent in suppression of deterioration of the light emitting element.

In general, according to one embodiment, the light emitting substrate is provided with a transparent substrate, a plurality of light emitting element groups, and a control unit. The plurality of light emitting element groups are formed by overlapping a first light emitting element and a second light emitting element on the transparent substrate. The control unit controls light emitting of the first light emitting element and the second light emitting element of the plurality of light emitting element groups. Amounts of light emitted from the plurality of light emitting element groups are uniform.

Hereinafter, the embodiment will be described with reference to drawings.

Figure 1:
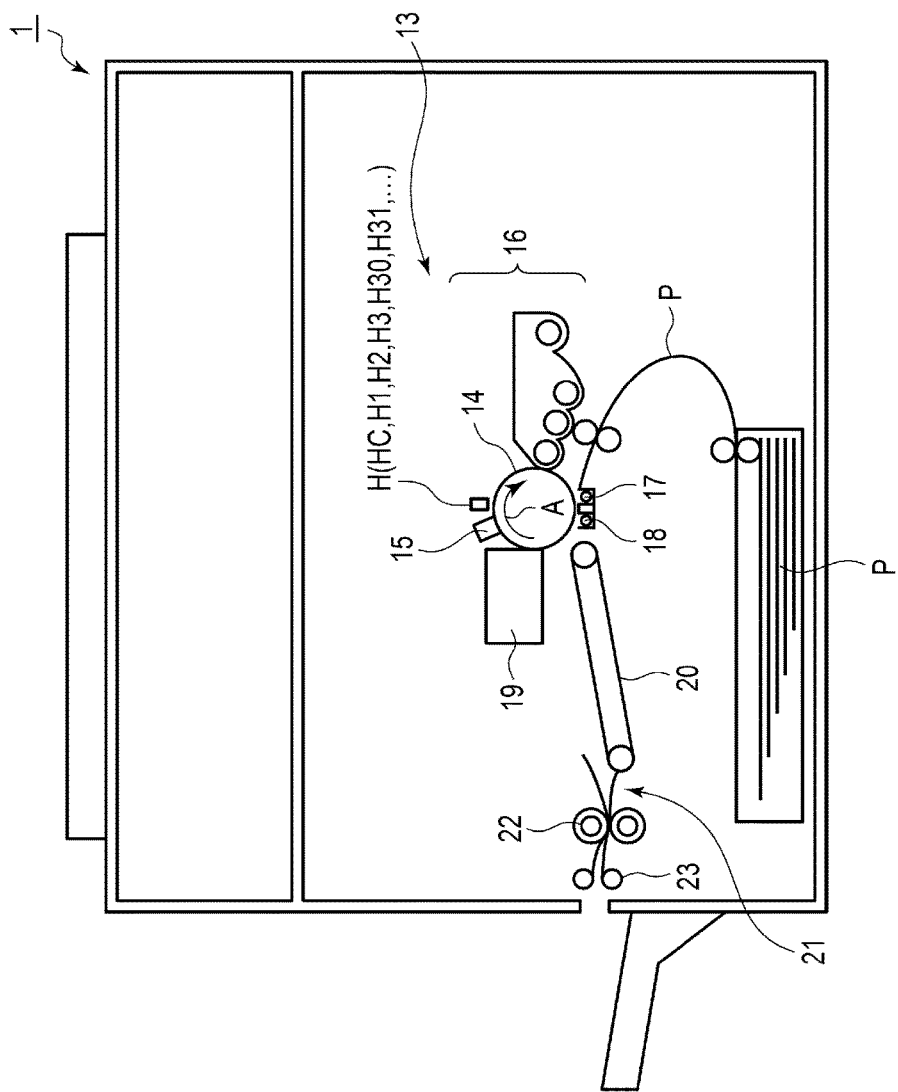
FIG. 1 is a sectional view illustrating an example of an image forming apparatus (image forming unit) according to an embodiment.
Figure 2:
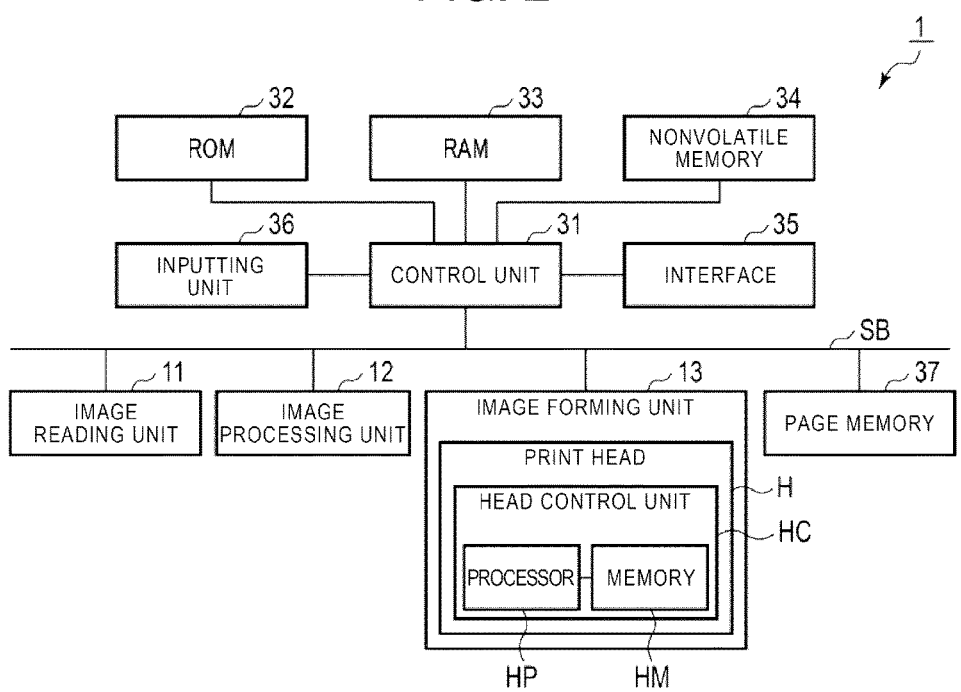
FIG. 2 is a block diagram illustrating an example of a control system of the image forming apparatus according to the embodiment.

FIG. 1 is a sectional view illustrating an example of an image forming apparatus (image forming unit) according to the embodiment. FIG. 2 is a block diagram illustrating an example of a control system of the image forming apparatus illustrated in FIG. 1. As the image forming apparatus illustrated in FIG. 1 and FIG. 2, for example, there are a printer, a copy machine, a complex machine, and the like. In FIG. 1 and FIG. 2, an example of a monochrome image forming apparatus is illustrated, but a print head H of the embodiment can be applied to a color image forming apparatus.

The print head H will be mainly described in the embodiment. As illustrated in FIG. 1, an image forming apparatus 1 is provided with an image forming unit 13 including the print head H.

Here, mechanisms of the image forming unit 13 will be described. The image forming unit 13 is provided with the print head H, an electrostatic charger 15, a developer 16, a transfer charger 17, a peeling charger 18, and a cleaner 19 in a vicinity of a photoconductive drum 14. The print head H will be described in detail next to FIG. 2. The electrostatic charger uniformly charges the photoconductive drum 14. The developer 16 develops a latent image generated in the charged photoconductive drum 14 on the basis of image data from an image reading unit 11. The transfer charger 17 transfers the developed image in the photoconductive drum 14 to a paper P. The cleaner 19 cleans a developing agent remained in the photoconductive drum 14.

The electrostatic charger 15, the developer 16, the transfer charger 17, the peeling charger 18, and the cleaner 19 are sequentially disposed along a rotation direction of an arrow A of the photoconductive drum 14. Also, the image forming unit 13 is provided with the print head H which is disposed to face the photoconductive drum 14.

The image forming unit 13 is provided with a transporting belt 20 and a paper discharging-transporting guide 21. The transporting belt 20 and the paper discharging-transporting guide 21 sequentially transport the paper P, to which toner images are transferred, with respect to a downstream of a transporting direction of the paper by the peeling charger 18. Further, the image forming unit 13 is provided with a fixing device 22 and a paper discharging roller 23. The fixing device 22 sequentially fixes toners of the paper P to the paper P with respect to the downstream of the transporting direction of the paper by the paper discharging-transporting guide 21, and the paper discharging roller 23 discharges the paper P.

Next, an image forming process will be described.

Figure 5:
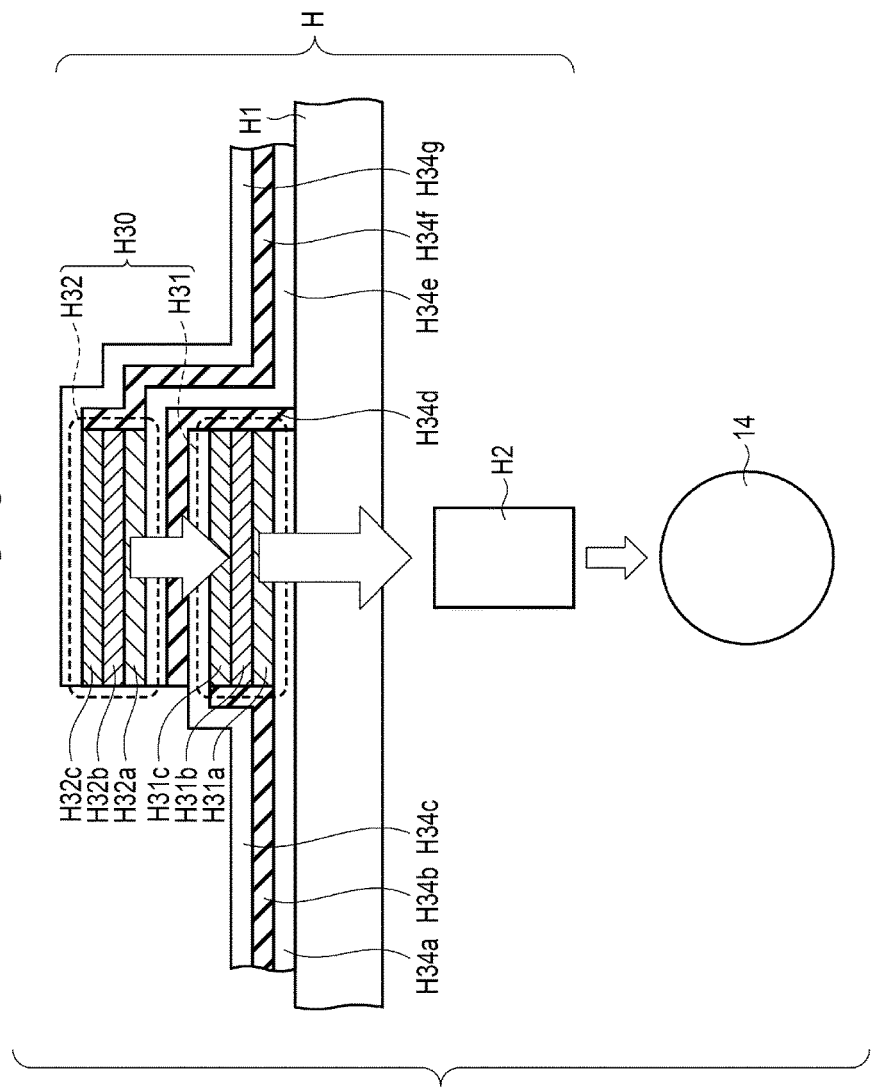
FIG. 5 is a view illustrating an example of a set of light element groups among a plurality of light emitting element groups in the print head according to the embodiment.

An electrostatic latent image, which is formed on the photoconductive drum 14 by light (third light, that is, superimposed light) from the print head H (light (first light) from a first light emitting element H31 and light (second light) from a second light emitting element H32 illustrated in FIG. 5), is developed by a toner (developing agent) supplied from the developer 16. The photoconductive drum 14, on which a toner image is formed, transfers the electrostatic latent image onto the paper P by the transfer charger 17.

In the photoconductive drum 14 of which transferring to the paper is finished, a remained toner on a surface of the photoconductive drum is removed by the cleaner 19, the photoconductive drum returns to an initial state, and becomes a waiting state for next image forming.

Image forming operations are continuously performed by repeating operations of the process described above.

The print head H of the embodiment is not limited to a print head in an electrophotographic process, and can be used as exposure means with respect to films, and the like.

Subsequently, with reference to FIG. 2, an outline of a control system of the image forming apparatus will be described. As illustrated in FIG. 2, the image forming apparatus 1 is provided with the image reading unit 11, an image processing unit 12, the image forming unit 13, a control unit 31, a ROM (memory only for reading, read-only memory) 32, a RAM (rewritable memory, random-access memory) 33, a nonvolatile memory 34, an interface 35, an inputting unit 36, and a page memory 37. In the control unit 31, the ROM 32, the RAM 33, the nonvolatile memory 34, the interface 35, and the inputting unit 36 are connected. Also, in the control unit 31, the image reading unit 11, the image processing unit 12, the image forming unit 13, and the page memory 37 are connected thereto through a system bus SB.

The control unit 31 controls operations such as image reading, image processing, and image forming. The ROM 32 stores a main program necessary for the control by the control unit 31. The RAM 33 temporally stores data necessary for the control by the control unit 31. The nonvolatile memory 34 stores updated programs, various parameters, and the like. The interface 35 outputs various information to the outside, or inputs various information from the outside. For example, the image forming apparatus 1 prints image data which is input through the interface 35 because of a print function. The inputting unit 36 receives an operating input from a user and a service man.

The image reading unit 11 acquires the image data of which an image of an original document is optically read, and outputs the image data to the image processing unit 12. The image processing unit 12 executes various image processes (including correction, and the like) on the image data input through the interface 35, or the image data from the image reading unit 11. The page memory 37 stores the image data processed by the image processing unit 12, and the image forming unit 13 forms an image based on the image data stored in the page memory 37. In addition, the image forming unit 13 is provided with the print head H, and the print head H is provided with a head control unit HC.

Figure 3:
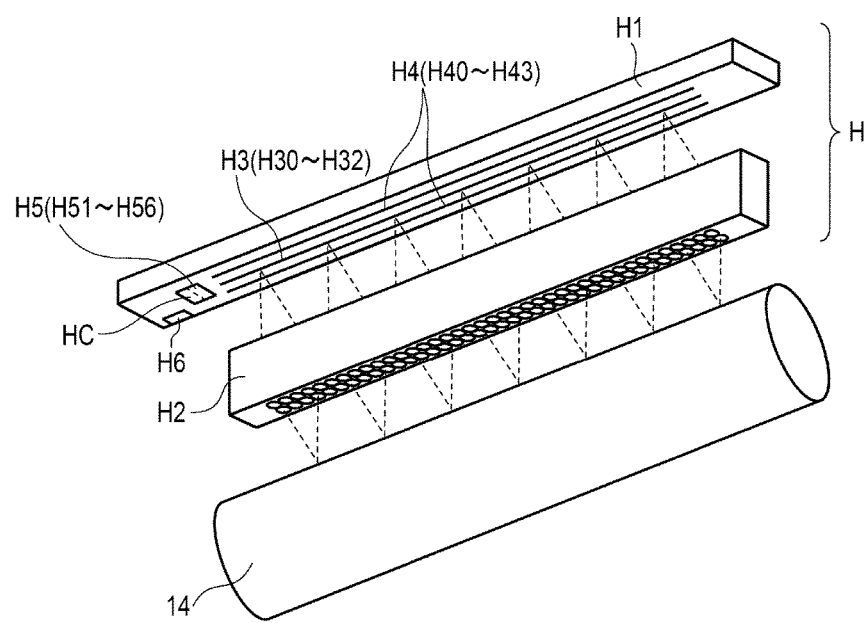
FIG. 3 is a view illustrating an example of a position relationship of a print head and a photoconductive drum in the image forming apparatus according to the embodiment.
Figure 4:
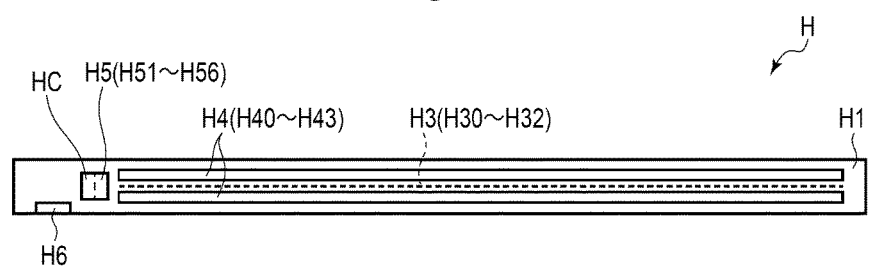
FIG. 4 is a view illustrating an example of a transparent substrate, and the like constituting the print head according to the embodiment.

FIG. 3 is a view illustrating an example of the position relationship of the print head H and the photoconductive drum 14 in the image forming apparatus according to the embodiment. FIG. 4 is a view illustrating an example of a transparent substrate constituting the print head H according to the embodiment. FIG. 5 is a view illustrating an example of a set of light element groups among a plurality of light emitting element groups in the print head H according to the embodiment.

As illustrated in FIG. 3 and FIG. 5, the print head H is disposed to face the photoconductive drum 14. As illustrated in FIG. 3, the print head H is provided with a transparent substrate H1 and a rod lens array H2. For example, the transparent substrate H1 is a glass substrate where light is transmitted. A light emitting element row H3 which corresponds to a plurality of light emitting element groups H30 on the transparent substrate H1 is formed. The light from the plurality of light emitting element groups H30 is transmitted to the rod lens array H2 and focuses on the photoconductive drum 14 (object).

Moreover, the light emitting element row H3 is configured with the plurality of light emitting element groups H30. The light emitting element group H30 is configured with the plurality of light emitting elements (multilayered light emitting layers). For example, the light emitting element group H30 is configured with a multiplexed light emitting element (light emitting layer), such as the first light emitting element H31 (light emitting layer H31b) and the second light emitting element H32 (light emitting layer H32b). A multiplexed structure of the light emitting element will be described later in detail.

The photoconductive drum 14 is uniformly charged by a charger, and when the photoconductive drum is exposed by the light from the first light emitting element H31 and the second light emitting element H32, a potential of the exposed part in the photoconductive drum 14 is lowered. That is, when emission and non emission of the first light emitting element H31 and the second light emitting element H32 are controlled, the electrostatic latent image is formed on the photoconductive drum 14.

For example, as illustrated in FIG. 2, the head control unit HC is provided with one or a plurality of processors HP and memories HM. For example, the one or the plurality of processors HP are one or a plurality of central processing unit (CPU). The one or the plurality of memories HM store a program and various data relating to the light emitting control of the print head H. The one or the plurality of processors HP control light emission of the print head H based on the program, and the like stored in the one or the plurality of memories HM. Moreover, since the head control unit HC (one or the plurality of processors HP) controls operations of the print head H based on an instruction from the control unit 31, the ROM 32, the nonvolatile memory 34, and the like, which store an operation program of the control unit 31, are also said a memory storing a part of a program relating to the light emitting control of the print head H.

As illustrated in FIGS. 3 and 4, the light emitting element row H3 is formed along a longitudinal direction of the transparent substrate H1 in the center on the transparent substrate H1. A DRV circuit row H4 for driving (emitting) each light emitting element (multiplexed first light emitting element H31 and second light emitting element H32) is formed in a vicinity of the light emitting element row H3. Also, the transparent substrate H1 is provided with a connector H6. The connector H6 is connected to the system bus SB, and makes the head control unit HC and the control unit 31 be capable of being communicated with each other. In addition, the head control unit HC is connected to a control circuit H5. For example, a substrate for sealing the light emitting element row H3, the DRV circuit row H4, and the like so as not to come into contact with the outside air is provided in the transparent substrate H1.

In FIGS. 3 and 4, an example in which the DRV circuit rows H4 (H40, H41, H42, and H43) are disposed on both sides of the light emitting element row H3 as a center is described, but the DRV circuit rows H4 may be arranged on one side.

Next, with reference to FIG. 5, the multiplexed structure of the light emitting element will be described. The light emitting element group H30 is provided with the first light emitting element H31 and the second light emitting element H32 which are stacked. In addition, the first light emitting element H31 and the second light emitting element H32 are connected to an individual DRV circuit H40. That is, an electrode is individually taken out from the first light emitting element H31 and the second light emitting element H32, and current adjusted with respect to the first light emitting element H31 and the second light emitting element H32 is supplied. Moreover, in FIG. 5, the substrate for sealing is omitted.

The light emitting element group H30 will be further described.

As illustrated in FIG. 5, the light emitting element group H30 is formed on the transparent substrate H1. For example, the light emitting element group H30 is provided with the first light emitting element H31 and the second light emitting element H32, which are disposed to face each other. The first light emitting element H31 and the second light emitting element H32 are stacked through an insulating layer H34d. The first light emitting element H31 is in contact with an electrode (+) H34a and an electrode (−) H34c, which are insulated by an insulating layer H34b, in a state of being sandwiched therebetween. In addition, the second light emitting element H32 is in contact with an electrode (+) H34e and an electrode (−) H34g, which are insulated by an insulating layer H34f, in a state of being sandwiched therebetween.

The individual first light emitting element H31 and second light emitting element H32 are overlapped and stacked by providing the insulating layer H34d between the first light emitting element H31 and the second light emitting element H32.

In order to output the first light from the first light emitting element H31 and the second light from the second light emitting element H32 to the transparent substrate H1 side, the insulating layer H34d has a transparency with respect to the first and the second light.

A side opposite to the transparent substrate H1 in the second light emitting layer H32b is structured to reflect the second light emitted by the second light emitting layer H32b. For example, a second electron carrying layer H32c has a structure (reflection property) for reflecting the second light from the second light emitting layer H32b. Otherwise, the electrode H34g has a structure (reflection property) for reflecting the second light from the second light emitting layer H32b.

A second hole carrying layer H32a, the electrode (+) H34e, the insulating layer H34d, the electrode (−) H34c, a first electron carrying layer H31c, and a first hole carrying layer H31a have transparency with respect to the first light emitted by the first light emitting layer H31b and the second light emitted by the second light emitting layer H32b. With such a structure, the first light and the second light are output toward the transparent substrate H1. In other words, the third light of which the first light and the second light are overlapped is output toward the transparent substrate H1.

Such first light emitting element H31 and second light emitting element H32 emit the first light and the second light having a substantial same wavelength. The second electron carrying layer H32c or the electrode (−) H34g on a side opposite to the transparent substrate H1 have a structure of reflecting the first light and the second light emitted by the first light emitting element H31 and the second light emitting element H32. Accordingly, the first light and the second light are overlapped with each other in one direction and can be output as the third light. Compared to a case in which light from one light emitting element is output, the large amount of light can be obtained using the third light.

In addition, the first light emitting element H31 and the second light emitting element H32 can be individually driven by providing the first light emitting element H31 and the second light emitting element H32 as an individual structure.

As described above, one light emitting element group is configured as a pair of one first light emitting element H31 and one second light emitting element H32 overlapped and stacked on the first light emitting element, and is configured with the light emitting elements which are individually driven.

Figure 6:
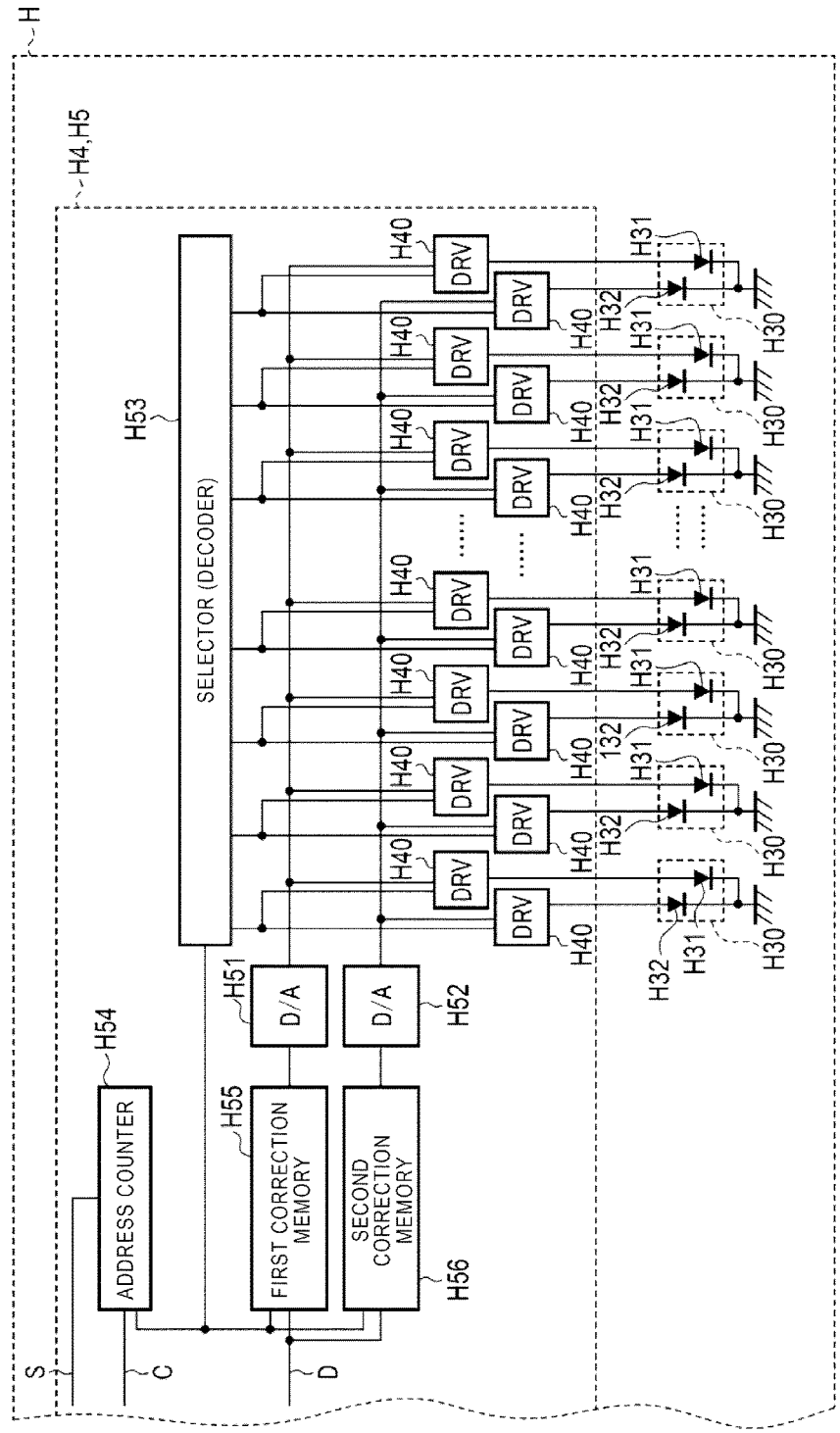
FIG. 6 is a diagram illustrating an example of a circuit configuration of the print head according to the embodiment.
Figure 7:
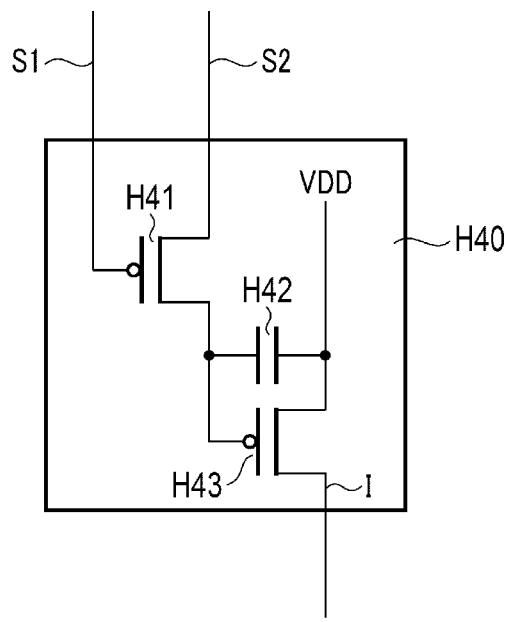
FIG. 7 is a diagram illustrating an example of a circuit configuration of a DRV circuit according to the embodiment.

FIG. 6 is a diagram illustrating an example of a circuit configuration of the head control unit HC, the DRV circuit row H4, and the control circuit H5 according to the embodiment. FIG. 7 is a diagram illustrating an example of a circuit configuration of the DRV circuit H40 of the DRV circuit row H4 according to the embodiment. With reference to FIG. 6 and FIG. 7, a configuration for flowing individual current through two light emitting elements (first light emitting element H31 and second light emitting element H32) will be described.

As illustrated in FIG. 6, the control circuit H5 is provided with digital-to-analog (D/A) conversion circuits H51 and H52, a selector H53, an address counter H54, a first correction memory H55, a second correction memory H56, and the like. The D/A conversion circuits H51 and H52, the selector H53, the address counter H54, the first correction memory H55, and the second correction memory H56 supply a signal for controlling light emitting intensity or turning on and off of each light emitting element to the DRV circuit H40. The DRV circuit H40 is connected to each of the first light emitting elements H31, and the DRV circuit H40 is connected to each second light emitting element H32. Individual current is supplied to the first light emitting element H31 and the second light emitting element H32 from the individual DRV circuit H40.

The D/A conversion circuit H51 is connected to the DRV circuit H40 connected to the light emitting element H31. The D/A conversion circuit H52 is connected to the DRV circuit H40 connected to the light emitting element H32.

The first correction memory H55 is connected to the D/A conversion circuit H51. The second correction memory H56 is connected to the D/A conversion circuit H52.

A horizontal synchronization signal S, a clock C, and image data D synchronizing with the clock C are transmitted to the head control unit HC of the print head H through the connector H6. The head control unit HC transmits the horizontal synchronization signal S, and the clock C to the control circuit H5. The horizontal synchronization signal S resets a count value of the address counter H54. The address counter H54 counts the clock C. The count value of the address counter H54 indicates which image data of the light emitting element group is the image data. The count value of the address counter H54 is output to the first correction memory H55, the second correction memory H56, and the selector (decoder) H53.

The first correction memory H55 outputs correction data, which is stored in an address indicated by a count value of the address counter H54, to the D/A conversion circuit H51 as light emitting data of the first light emitting element H31. The D/A conversion circuit H51 outputs an analog signal of a level corresponding to the input light emitting data to the DRV circuit H40 as a light emitting level signal S2. That is, the first correction memory H55 stores first current data (corresponding to current value "FF" of light emitting element groups No. 1 to 20 of FIG. 10) with respect to each of a plurality of the first light emitting elements H31.

The second correction memory H56 outputs the correction data stored in the address indicated by the count value of the address counter H54 to the D/A conversion circuit H52 as light emitting data of the second light emitting element H32. The D/A conversion circuit H52 outputs the analog signal of the level corresponding to the input light emitting data to the DRV circuit H40 as the light emitting level signal S2. That is, the second correction memory H56 stores second current data (corresponding to current values "6D", "3F", ..., "55", and "6D" of light emitting element groups No. 1 to 20 of FIG. 10) with respect to each of a plurality of the second light emitting elements H32.

The count value of the address counter H54 is output to the selector (decoder) H53. The selector (decoder) H53 sets a selection signal S1 of two DRV circuits H40, which are connected to a line designated by the count value, as "L". The selection signal S1 reaches an "L" level when the light emitting intensity of the first light emitting element H31 or the second light emitting element H32 connected to the DRV circuit H40 is changed. When the selection signal S1 reaches the "L" level, a voltage of the condenser H42 inside each DRV circuit H40 is changed in accordance with a level of the analog signal (light emitting level signal S2) output by the D/A conversion circuits H51 and H52. Next, when the count value of the address counter H54 is changed and the selection signal S1 reaches "H", a voltage of the condenser H42 is maintained. In a state of "H" of the selection signal S1, a voltage level of the condenser H42 is not changed even when a voltage of the light emitting level signal S2 is changed. The current in accordance with the voltage maintained in the condenser H42 flows in the first light emitting element H31 or the second light emitting element H32 connected to a signal line I of the DRV circuit H40.

As described above, a predetermined light emitting element group H30 is selected from the plurality of light emitting element groups H30 included in the light emitting element row H3 by the selection signal S1 being output from the selector (decoder) H53, and a light emitting intensity of each of the first light emitting element H31 and the second light emitting element H32 is determined by the light emitting level signal S2 being output from the D/A conversion circuits H51 and H52, and thus these light emitting intensities are maintained.

Therefore, after even when the count value of the address counter H54 is changed and each selection signal S1 turns into the "H" from the "L", each light emitting element continuously emits light according to the analog signal level maintained in the condenser H42.

Also, if the image data D is non-light emitting data, outputting of the first correction memory H55 and the second correction memory H56 becomes invalid. For example, the data input to the D/A conversion circuits H51 and H52 becomes "00", and a potential maintained in the condenser H42 reaches a level where each element is not emitted.

As described above, the head control unit HC respectively controls the light emitting intensities of the stacked first light emitting element H31 and second light emitting element H32 according to the correction data stored in the first correction memory H55 and the second correction memory H56, and is capable of controlling each of the light emitting element groups.

Next, light from each light emitting element will be described.

As illustrated in FIG. 5, light from the light emitting element group, that is, light (superimposed light of which light from the first light emitting element H31 and light from the second light emitting element H32 are superimposed) from the first light emitting element H31 and the second light emitting element H32 makes the photoconductive drum 14 be exposed by passing through the transparent substrate H1 and the rod lens array H2.

Figure 8:
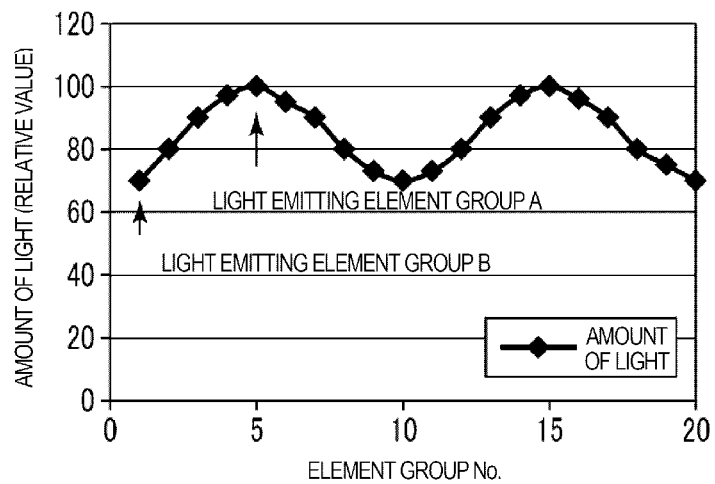
FIG. 8 is a diagram illustrating an example of light intensity (amount of light) after each light emitting element group passes through a lens, when current uniformly flows in a first light emitting element in the print head according to the embodiment.

FIG. 8 is a diagram illustrating an example of the light intensity (amount of light) after passing through a lens of each light emitting element group when only the first light emitting element H31 is light with uniform current. That is, FIG. 8 is a diagram illustrating an example of variation of the amount of light on the photoconductive drum by an effect of transmittance of a lens.

Figures 9, 10, 11:
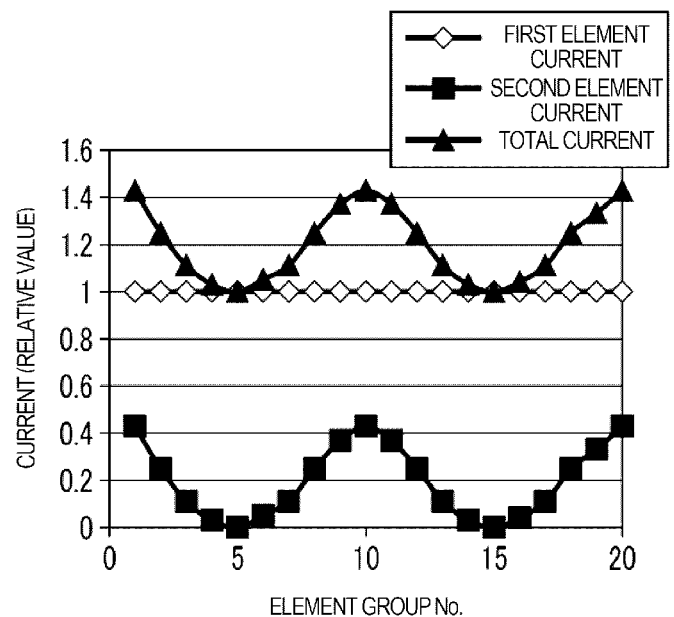
FIG. 9 is a table illustrating an example of current data (not corrected) which is stored in a first correction memory and a second correction memory.
FIG. 10 is a table illustrating an example of current data (corrected) which is stored in the first correction memory and the second correction memory.
FIG. 11 is a graph illustrating an example of current and total current flowing in each light emitting element group at the time of correcting the amount of light according to the embodiment.

In order that this measurement is performed (only the first light emitting element H31 is uniformly emitted), for example, the first correction memory H55 and the second correction memory H56 store data illustrated in FIG. 9.

For example, the first correction memory H55 corresponds to each of the first light emitting elements H31 and stores correction data of "FF" (maximum value of 8 bit), and the second correction memory H56 corresponds to each second light emitting element H32 and stores correction data of "00" (minimum value: non-light emission). The head control unit HC sequentially emits each light emitting element group based on the correction data of the first correction memory H55 and the second correction memory H56, and measures the light intensity (amount of light) thereof (refer to FIG. 8).

When the amount of light passing through the lens is corrected to be a constant value, for example, the first correction memory H55 and the second correction memory H56 store data illustrated in FIG. 10.

The first correction memory H55 stores a constant value "FF" corresponding to each of the first light emitting elements H31.

The second correction memory H56 stores the correction data (light emitting data) of each of the second light emitting elements H32 according to the light intensity (amount of light) when each of the first light emitting elements H31 is emitted on the basis of the constant value "FF". That is, the correction data of the second correction memory H56 functions to correct variation of the amount of light on the photoconductive drum.

For example, as illustrated in FIG. 8, since the light intensity (amount of light) of the first light emitting element H31 of the light emitting element group No. 5 (light emitting element group A) is one of the greatest values, the second light emitting element H32 does not need to be emitted. For example, "00" is required to be stored in an address 5 of the second correction memory H56.

As illustrated in FIG. 8, the light intensity (amount of light) of the first light emitting element H31 of the light emitting element group No. 1 (light emitting element group B) is one of the smallest values. Here, the light intensity (amount of light) is required to be increased by emitting the second light emitting element H32 of the light emitting element group No. 1 (light emitting element group B). For example, "6D" is required to be stored in an address 1 of the second correction memory H56. (refer to FIG. 10)

FIG. 11 is a graph illustrating current flowing in each light emitting element group when the amount of light is corrected, and illustrates an example of current (relative value) and total current (relative value) of each light emitting element group corresponding to FIG. 10.

As illustrated in FIG. 11, constant current flows in each of the first light emitting elements H31 along the light emitting data "FF". In addition, the current flows in each of the second light emitting elements H32 in accordance with the correction data (light emitting data) written in each address. That is, the current flowing in each of the second light emitting elements H32 is not constant.

Figure 12:
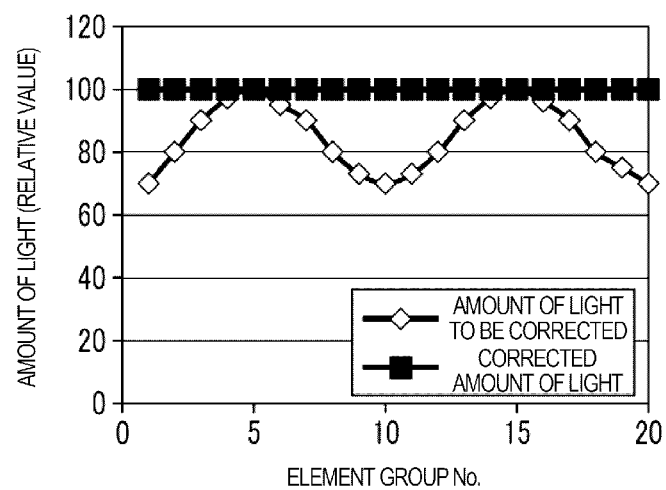
FIG. 12 is a graph illustrating a comparative example of the light intensity (amount of light) at the time of correcting the amount of light (after correction of amount of light) and the light intensity (amount of light) at the time of not correcting the amount of light (before correction of amount of light) according to the embodiment.

As illustrated in FIG. 12, after the correction, light, which is emitted by the second light emitting element H32 where respectively different constant current values are supplied, is added to the light intensity (amount of light) of light emitted by the first light emitting element H31 where the constant current value is supplied, a substantial constant light intensity (amount of light) is obtained.

Regarding storage of the correction data, for example, the correction data (with reference to FIG. 10) is stored in the first correction memory H55 and the second correction memory H56 of the control circuit H5 at the time of shipping the image forming apparatus 1. In addition, the correction data of the first correction memory H55 and the second correction memory H56 also can be updated as the correction data input through the interface 35. Further, the correction data of the first correction memory H55 and the second correction memory H56 also can be updated on the basis of inputting of change of the correction data through the inputting unit 36 of a service man, or the like.

Next, change properties as time elapses when the amount of light is corrected will be described.

Figure 13:
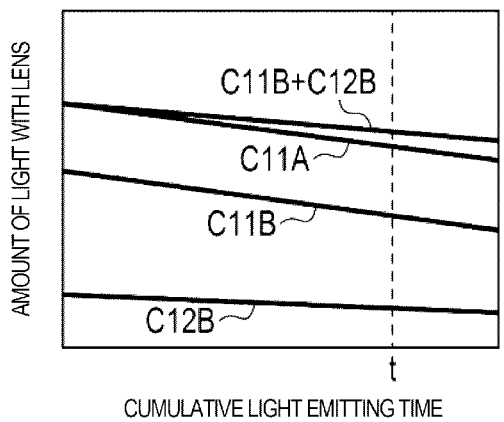
FIG. 13 is a diagram illustrating an example of an amount of light degradation of each light emitting element and each light emitting element group with respect to cumulative light emitting time.

FIG. 13 is a graph illustrating an example of degradation (deterioration) of the amount of light with respect to the cumulative light emitting time.

For example, an aspect of degradation of the amount of light with respect to the cumulative light emitting time of the light emitting element group H30 in which the light amount passing through the lens reaches a predetermined light intensity (amount of light) by flowing current corresponding to the light emitting data "FF" to only the first light emitting element H31 is illustrated as C11A in FIG. 13. The above description corresponds to the light emitting element group A. In this case, in a cumulative light emitting time t, the amount of light of the light emitting element group A is degraded by approximately 20%.

Next, the aspect of degradation of the amount of light with respect to the cumulative light emitting time of the light emitting element group H30 in which the light amount passing through the lens reaches a predetermined light intensity (amount of light) by flowing current corresponding to the light emitting data "FF" to the first light emitting element H31 and flowing current corresponding to the light emitting data "6D" to the second light emitting element H32 is illustrated as C11B+C12B in FIG. 13. Also, an aspect of degradation of the amount of light of each of the first light emitting element H31 and the second light emitting element H32 is illustrated as C11B and C12B in FIG. 13. This description corresponds to a case of the light emitting element group B described above. For example, in this case, in the cumulative light emitting time t, the amount of light C11B of the first light emitting element H31 of the light emitting element group B is degraded by approximately 20%, and the amount of light C12B of the second light emitting element H32 of the light emitting element group B is degraded by approximately 10%. A ratio of degradation of the amount of light of the first light emitting element H31 of the light emitting element group B is substantially 20%, and it is the same as a ratio of degradation of the amount of light of the first light emitting element H31 of the light emitting element group A. Because both the current being supplied to the first light emitting element H31 of the light emitting element group A and the current being supplied to the first light emitting element H31 of the light emitting element group B are the same because these are current with respect to the light emitting data "FF". Also, the current, which corresponds to the light emitting data "6D", being supplied to the second light emitting element H32 of the light emitting element group B is smaller than the current, which corresponds to the light emitting data "FF", being supplied to the first light emitting element H31. Therefore, the degradation ratio of the amount of light of the second light emitting element H32 of the light emitting element group B is smaller than the degradation ratio of the amount of light of the first light emitting element H31.

When the light emitting element groups A and B are compared to each other, the degradation ratio of the amount of light of the light emitting element group B is lowered. A difference between the groups depends on the amount of the current flowing and the light intensity (amount of light) for which the second light emitting element H32 compensates. However, regarding the degradation ratio of the amount of light of the light emitting element group B, the degradation ratio of the amount of light of the first light emitting element H31 of the light emitting element group B is dominant, and the degradation ratio of the amount of light of the first light emitting element H31 of the light emitting element group B and the degradation ratio of the amount of the first light emitting element H31 of the light emitting element group A are substantially equal to each other. Accordingly, a difference of the degradation ratios of the amount of light of the light emitting element groups A and B is smaller than that of a case when the amount of light is constant by flowing different current to the light emitting element formed of the single light emitting layer to be described later.

Also, a case 1 in which a large amount of the current flows in the first light emitting element H31 and a small amount of current flows in the second light emitting element H32 is described. For example, as a case in which the large amount of the current flows the first light emitting element H31 near the transparent substrate H1 from a route of the light emitted by the light emitting element and the first light emitting element is efficient to be handled as a main light emitting element, the case 1 is adopted. However, there may be a case 2 reversing this relationship.

In addition, a case in which constant current (uniform current) flows in each of the first light emitting elements H31, non-constant current (non-uniform current) flows in each of the second light emitting elements H32, and an amount of light at a certain desired level is obtained is described, but there may be a case in which the non-constant current flows in each of the first light emitting elements H31 and each of the second light emitting elements H32 and an amount of light at a certain desired level is obtained. In this case, the current value being supplied to each of the first light emitting elements H31 and the current value being supplied to each of the second light emitting elements H32 are adjusted to be less than a predetermined current value. Accordingly, compared to the light emitting element to which an amount of the current having a predetermined current value is supplied, degradation of the amount of light of the first light emitting element H31 of the first light emitting layer H31b and the second light emitting element H32 of the second light emitting layer H32b can be suppressed.

As described above, the print head H is structured with the first light emitting element H31 and the second light emitting element H32 which are stacked. When the stacked first light emitting element H31 is set to a main light emitting element and the amount of light is insufficient, the light from the second light emitting element H32 is supplied to compensate the insufficient amount of light. With such a configuration, when the current flowing in the main light emitting element is uniform, difference of deterioration properties generated in the light emitting element groups can be reduced.

Also, in the embodiment, the example in which two light emitting elements are stacked is described, but light emitting elements are not limited to two, and three, or more of the light emitting elements may be stacked.

In addition, in the embodiment, the example in which two light emitting elements are stacked and the current flowing in each of the light emitting elements is controlled is described, but lighting time of each of the light emitting elements may be controlled. Specifically, a configuration may be applied as long as combination of the D/A conversion circuits H51 and H52 and the DRV circuit H40 can be replaced by a PWM circuit and light emitting time of each of the light emitting elements can be individually set.

In addition, in the embodiment, a structure in which the electrode (+) and the hole transporting layer are disposed on the transparent substrate H1 side, and the electron transporting layer and the electrode (−) are disposed on a side opposite to the transparent substrate side with the light emitting layer in a state of being sandwiched therebetween, is used, but this disposing is not limited, and a structure may be used, in which the electrode (−) and the electron transporting layer are disposed on the transparent substrate H1 side, and the hole transporting layer and the electrode (+) are disposed on a side opposite to the transparent substrate side with the light emitting layer in a state of being sandwiched therebetween.

Figure 14:
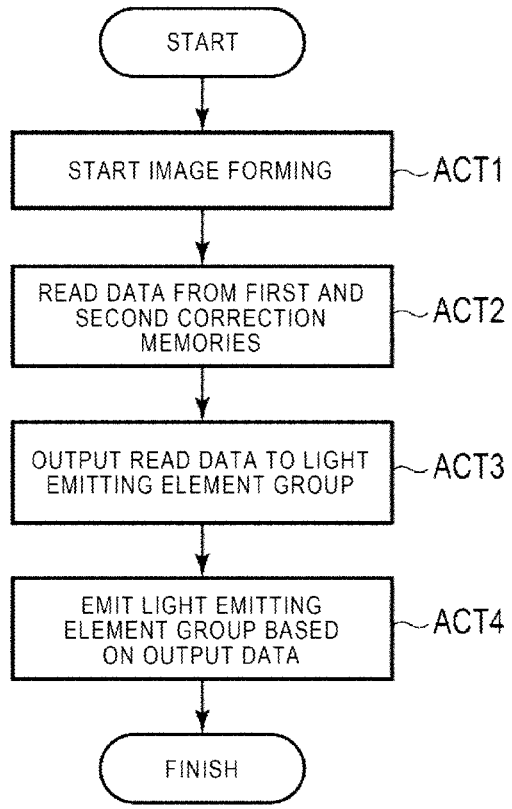
FIG. 14 is a flow chart illustrating an example of a light emitting control using a head control unit of the print head according to the embodiment.

Next, an example of the light emitting control will be described. FIG. 14 is a flow chart illustrating an example of the light emitting control by the head control unit HC according to the embodiment.

The control unit 31 instructs the head control unit HC to start image formation (ACT 1). That is, the control unit 31 instructs the head control unit HC to emit the print head H, and the processor HP of the head control unit HC reads data from the first correction memory H55 and the second correction memory H56 (ACT 2). The processor HP of the head control unit HC controls light emitting and non emitting of each light emitting element group H30 according to the image data D. The processor HP of the head control unit HC outputs the data read from the first correction memory H55 and the second correction memory H56 to the light emitting element group H30 of an object to be emitted (ACT 3). Accordingly, when the data illustrated in FIG. 10 is stored in the first correction memory H55 and the second correction memory H56, a constant current value is supplied to each of the first light emitting elements H31 of the object to be emitted, the first light emitting element of the object to be emitted is emitted, a current value for correcting variation of the amount of light is supplied to each of the second light emitting elements H32 of the object to be emitted, and the second light emitting element H32 of the object to be emitted is emitted (ACT 4).

Next, an action effect of the print head will be described.

Already, it is described that, when the current flowing in each of the light emitting element is controlled (changed) in each light emitting element so as to uniform the light intensity (amount of light) or a diameter of a light beam on the photoconductive drum, deteriorated speed of each of the light emitting elements is changed. That is, even when the light intensity (amount of light) or the diameter of the light beam on the photoconductive drum is uniformly controlled at an initial stage, if the current flowing in each light emitting element is different, the light emitting time is increased and variation of the light intensity (amount of light) or the diameter of the light beam is generated. That is, it is not easy that the light intensity (amount of light) or the diameter of the light beam is uniformly maintained for a long time and good image quality is maintained.

FIG. 15 to FIG. 20 are explanatory diagrams for describing a phenomenon described above, and are explanatory diagrams relating to a print head configured with a single light emitting layer as a comparative example of the print head configured with the multilayered light emitting layers illustrated in FIG. 3 to FIG. 7.

Figure 15:
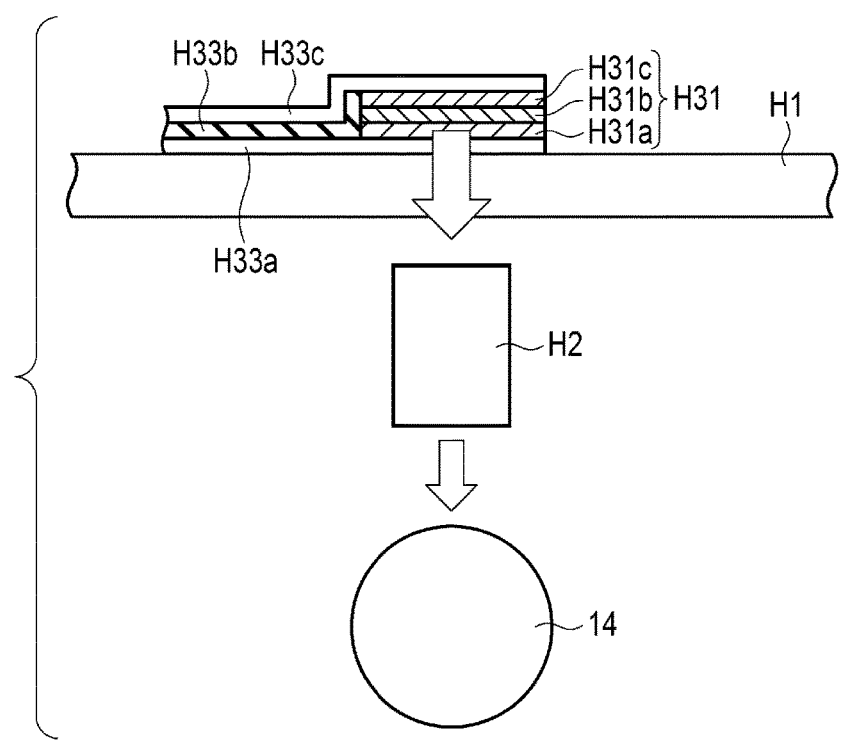
FIG. 15 is a view illustrating an example of the print head configured with the light emitting element of a single light emitting layer.

FIG. 15 is a view illustrating an example of the print head configured with the light emitting element of the single light emitting layer. For example, as illustrated in FIG. 15, light from the light emitting element H31 constituted by an organic EL (OLED) passes through the transparent substrate H1 and the rod lens array H2 so that the photoconductive drum 14 is exposed. When a constant current value is supplied to each light emitting element, the light intensity (amount of light) on the photoconductive drum 14 is not uniform.

Here, uniformity of the light intensity (amount of light) on the photoconductive drum 14 is achieved by supplying a different current value to each light emitting element.

Figure 16:
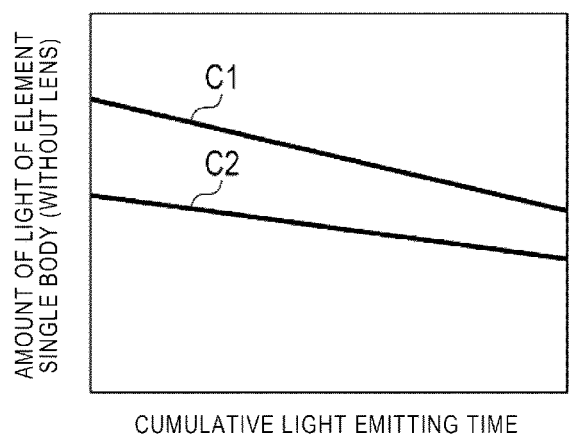
FIG. 16 is a diagram illustrating an example of the light intensity (amount of light) of the light emitting element which is changed by lapse of time in the print head configured with the light emitting element of the single light emitting layer.

In this case, a deterioration ration of each light emitting element is varied in accordance with the current value being supplied to each light emitting element. FIG. 16 is a graph illustrating an example of which the light intensity (amount of light) output from the light emitting element is changed as time elapses. In FIG. 16, a horizontal axis indicates the cumulative light emitting time of the light emitting element, and a vertical axis indicates the light intensity (amount of light) of the light emitting element. FIG. 16 illustrates an aspect of a change of the light intensity (amount of light) when the different current flows in the light emitting element. The current is respectively illustrated as C1 and C2 of FIG. 16.

When the current flowing in the light emitting element is great, the light intensity (amount of light) is great. When the current flowing in the light emitting element is small, the light intensity (amount of light) is small. If each element is continuously emitted, a degradation ratio of the light intensity (amount of light) of the light emitting element where a large amount of current flows is great (C1), and a degradation ratio of the light intensity (amount of light) of the light emitting element where a small amount of current flows is lowered (C2).

Figure 17:
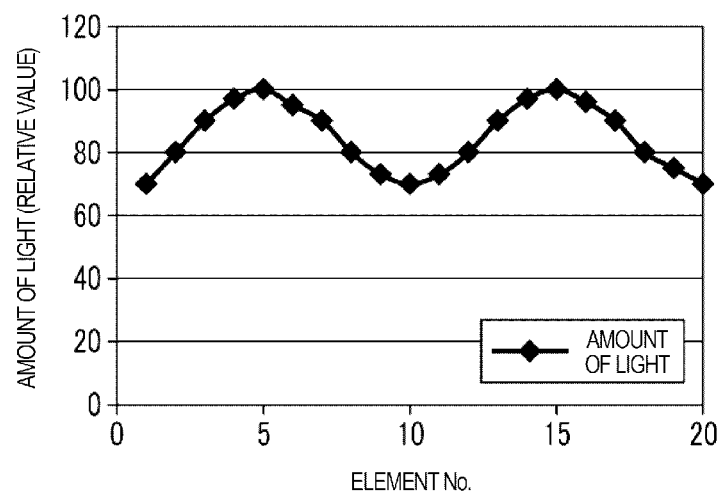
FIG. 17 is a graph illustrating an example of the light intensity (amount of light) after the light passes through a lens when current uniformly flows in the light emitting element of the single light emitting layer.

FIG. 17 is a graph illustrating an example of the light intensity (amount of light) that each light emitting element outputs after the light pass through a lens when constant current is applied to the light emitting elements so that 20 light emitting elements are emitted. As illustrated in FIG. 17, even when each light emitting element is emitted with the same current, the light intensity (amount of light) after the light passes through the lens is not constant. This is because that light transmission efficiency is varied according to a position relationship of the light emitting element and the lens, or the like. When an image is formed in such a state in which variation is generated in the light emitting intensity (amount of light) after passing through a lens, a density unevenness is generated in the image. In order to avoid generation of the density unevenness, the amount of light is corrected.

Figure 18:
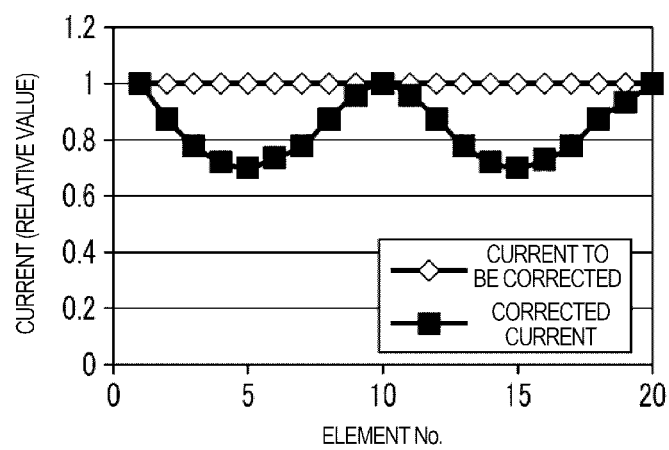
FIG. 18 is a graph illustrating an example of a current value before correction of the amount of light and a current value after correction of the amount of light of the print head configured with the light emitting element of the single light emitting layer.

FIG. 18 is a graph illustrating an example of the current value of the amount of light to be corrected and the current value of the corrected amount of light of the print head configured with the light emitting element of the single light emitting layer. The current with respect to the light emitting element corresponding to the high light intensity (amount of light) after passing through the lens by correction of the amount of light is reduced, and the current becomes uniform as the low light intensity (amount of light). For example, the light intensity (amount of light) of the light emitting element No. 5 is made to be the same as the light intensity (amount of light) of a light emitting element No. 10 by reducing the current flowing in the light emitting element No. 5.

Figure 19:
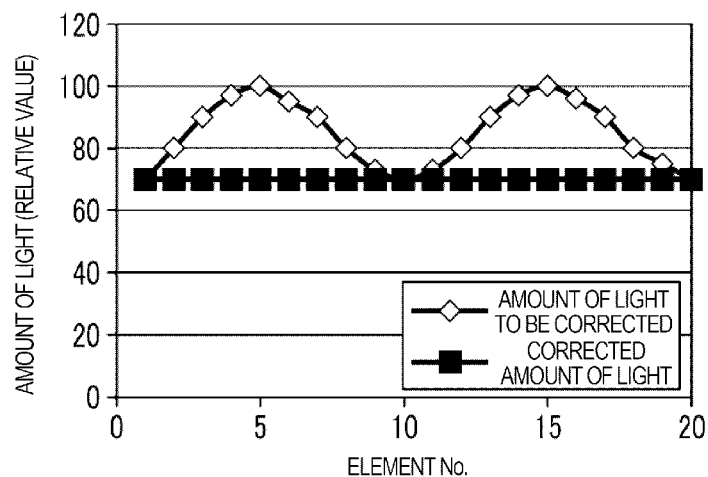
FIG. 19 is a graph illustrating an example of the amount of light before correction of the amount of light and the amount of light after correction of the amount of light of the print head configured with the light emitting element of the single light emitting layer.

FIG. 19 is a graph illustrating an example of the amount of light before correction of the amount of light and the amount of light after correction of the amount of light of the print head configured with the light emitting element of the single light emitting layer. As illustrated in FIG. 19, the light intensity (amount of light) from each light emitting element after correction of the amount of light becomes uniform as the lowest light intensity (amount of light) before correction of the amount of light.

As described above, an image having good quality without a density unevenness can be obtained by aligning the light intensity (amount of light).

However, in correction of the amount of light described above, deterioration of the light emitting element where the large amount of the current flows is quickly proceeded than the light emitting element where the small amount of the current flows as the cumulative light emitting time elapses, as a result, the amount of light is varied.

Figure 20:
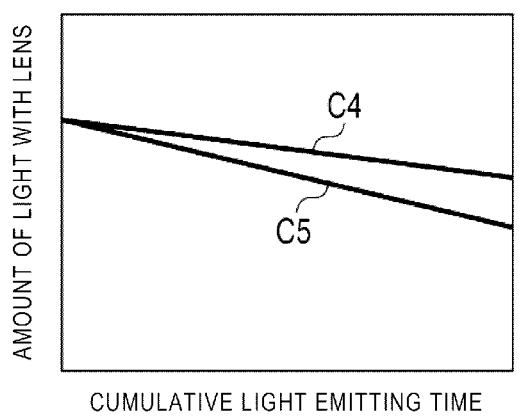
FIG. 20 is a diagram illustrating an aspect of the light intensity (amount of light) with respect to the cumulative light emitting time after correction of the amount of light of the print head configured with the light emitting element of the single light emitting layer.

FIG. 20 is a graph illustrating an aspect of a change of the light intensity (amount of light) with respect to the cumulative light emitting time after correction of the amount of light of the print head configured with the light emitting element of the single light emitting layer. As described above, the amount of the current flowing in each light emitting element is changed so that the light intensity (amount of light) becomes uniformed after passing through the lens, and for example, there are a light emitting element in which a way of degradation proceeding is different as illustrated in C4 or C5. Compared to C4, degradation of C5 is fast. Here, current flowing to a light emitting element of properties illustrated as C5 is greater than current flowing to a light emitting element of properties illustrated as C4.

As illustrated in FIG. 20, the light intensity (amount of light) of the light emitting elements, which are emitted at the light intensity of the same level in an initial stage, are also varied as the cumulative light emitting time elapses.

If each light emitting element is deteriorated with the same property according to the cumulative light emitting time, the light intensity (amount of light) of each light emitting element can be constantly maintained by changing the current in accordance with cumulative time of each light emitting element and aligning light emitting time of each light emitting element.

However, if the current flowing in each light emitting element from the initial stage is different, and degrees of degradation of the light intensity (amount of light) with respect to the cumulative light emitting time are also different, it is not easy to align the light emitting intensity of each light emitting element.

Thus, according to the print head H configured with the multilayered light emitting element of the embodiment described with reference to FIG. 1 to FIG. 14, even when the current value to each light emitting element is not increased to a predetermined value or more, shortage of the amount of light can be compensated by the multilayered light emitting element, and a difference of the degrees of proceeding of the deterioration becomes reduced.

For example, in the print head H of the embodiment, the current value flowing to the first light emitting element H31 of a first layer is constant (for example, current value a), the current value flowing (for example, current value b) to each second light emitting element H32 of a second layer is changed in accordance with the light intensity (amount of light) on the photoconductive drum 14 (current value b<current value a). That is, the shortage of the amount of light of the first light emitting element H31 of the first layer can be compensated with the amount of light of the second light emitting element H32 of the second layer, even when the current value of the first light emitting element H31 of the first layer is not increased to a predetermined value or more.

Otherwise, the current value to each second light emitting element H32 of the second layer is constant (for example, current value a), and the current value to each first light emitting element H31 of the first layer (for example, current value b) is changed in accordance with the light intensity (amount of light) on the photoconductive drum 14 (current value b<current value a). That is, the shortage of the amount of light of the second light emitting element H32 of the second layer can be compensated with the amount of light of the first light emitting element H31 of the first layer, even when the current value of the second light emitting element H32 of the second layer is not increased to a predetermined value or more.

Otherwise, the current value (current value c) to each first light emitting element H31 of the first layer and the current value (current value d) to each second light emitting element H32 of the second layer are changed in accordance with the light intensity (amount of light) on the photoconductive drum 14. That is, the shortage of the amount of light can be compensated with the amount of light of the first light emitting element H31 of the first layer and the amount of light of the second light emitting element H32 of the second layer. (current value c and current value d are not also constant.)

As described above, since the current value for correcting the amount of light is changed without being increased to a predetermined value or more because the light emitting element becomes a multilayer, an influence of a degree of deterioration of the light emitting element due to a change of the current value can be lowered. That is, variation of deterioration of each light emitting element can be suppressed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A light emitting substrate comprising:
a transparent substrate;
a plurality of light emitting element groups which are formed by a first light emitting element on the transparent substrate and a second light emitting element over the first light emitting element; and
a control unit that controls light emitting of the first light emitting element and the second light emitting element of the plurality of light emitting element groups,
wherein amounts of light emitted from the plurality of light emitting element groups are uniform.

2. The substrate according to claim 1,
wherein, in the control, the first light emitting element and the second light emitting element of the light emitting element group are individually controlled.

3. The substrate according to claim 1,
wherein the first light emitting element and the second light emitting element of the light emitting element group are organic EL.

4. A print head comprising:
a transparent substrate;
a plurality of light emitting element groups which are formed as a first light emitting element on the transparent substrate and a second light emitting element over the first light emitting element;
a lens that condenses superimposed light from the first light emitting element and the second light emitting element of each light emitting element group; and
a control unit that controls an amount of emitted light of the first light emitting element and the second light emitting element of the plurality of light emitting element groups, wherein the amounts of light from the plurality of light emitting element groups passing through the lens are uniform.

5. The head according to claim 4,
wherein, in the control, the amounts of light of the first light emitting element and the second light emitting element of the light emitting element group are individually controlled.

6. The head according to claim 4,
wherein the first light emitting element and the second light emitting element of the light emitting element group are organic EL.

7. The head according to claim 4,
wherein the control unit includes a memory for controlling the amount of light in order to control the amount of light of the first light emitting element or the second light emitting element of the light emitting element group.

8. An image forming apparatus comprising:
the print head according to any one of claims 4 to 7;
a photoconductive body;
a charger that charges the photoconductive body; and
a developer that develops a latent image on the photoconductive body,
wherein the print head irradiates the photoconductive body with light, exposes the photoconductive body charged by the charger, and forms the latent image on the photoconductive body.

* * * * *